Patented Mar. 12, 1929.

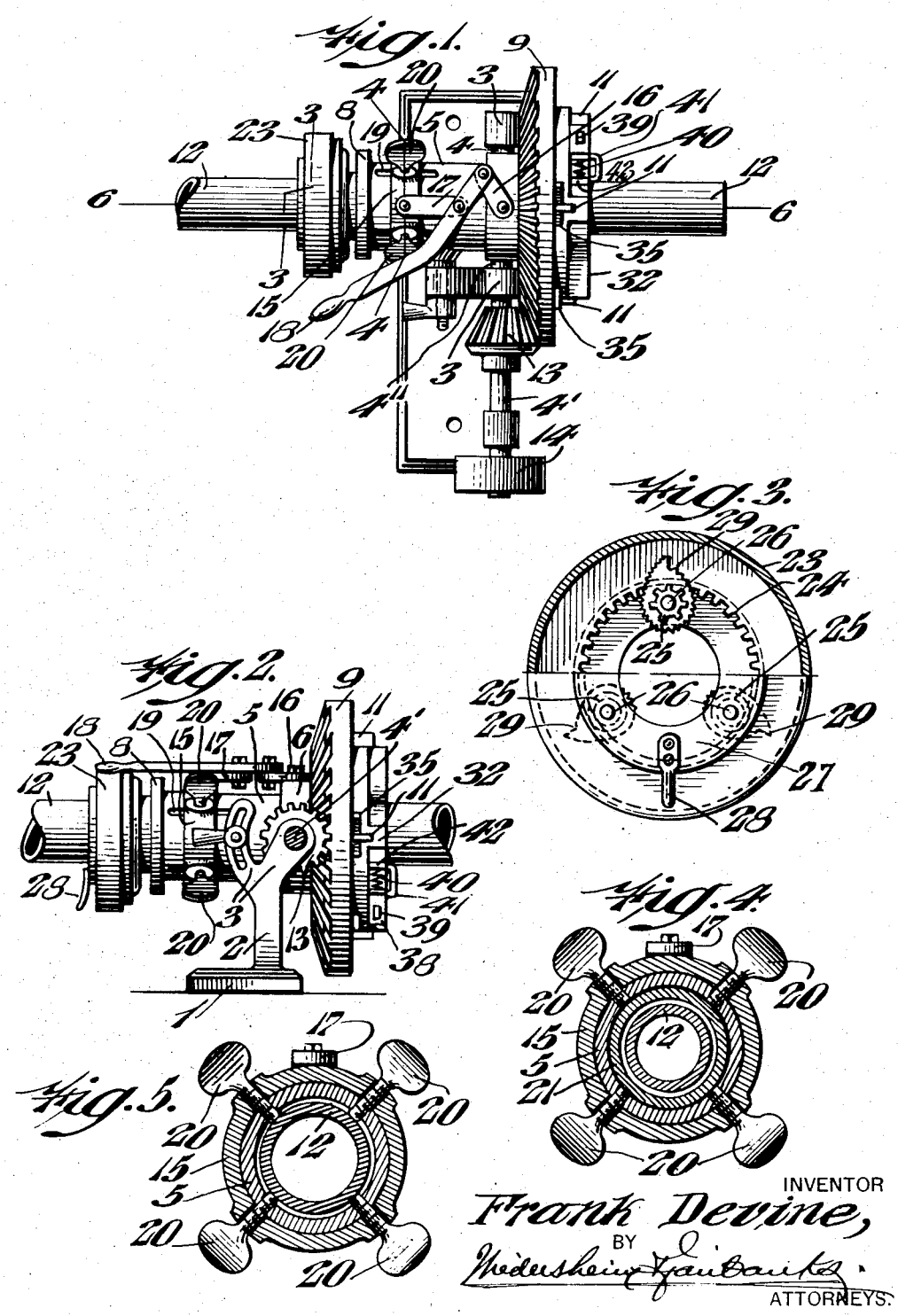

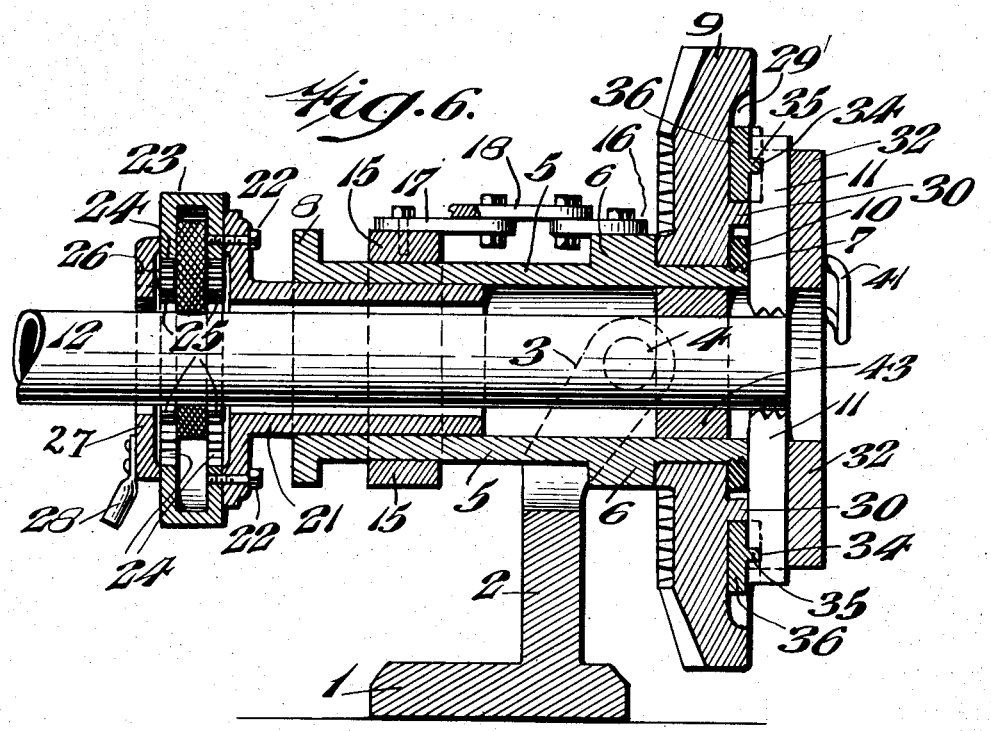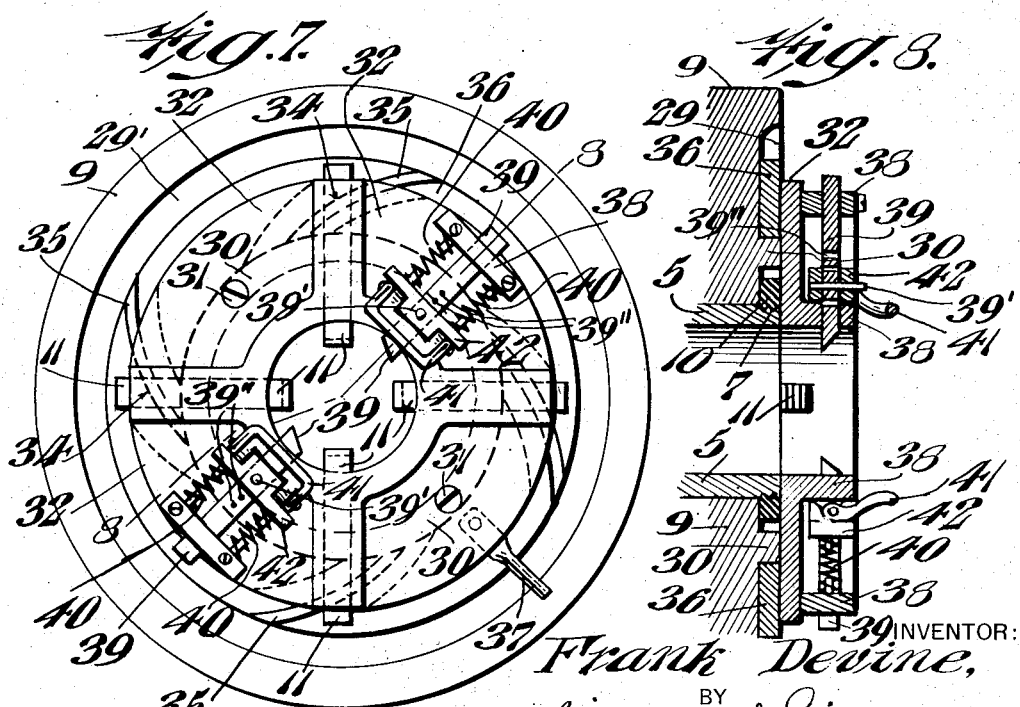

1,705,240

UNITED STATES PATENT OFFICE.

FRANK DEVINE, OF PHILADELPHIA, PENNSYLVANIA.

PIPE-THREADING MACHINE.

Application filed April 29, 1926, Serial No. 105,373. Renewed January 28, 1929.

The fundamental object of my invention is to make a pipe threading machine fixed on its own base yet possessing the lightness and simplicity of the hand die stock. If a pipe threading machine of the conventional type is supported rigidly on a base, that machine must support the entire length of a pipe put into it. In order to effectively do this, the machine must be of heavy construction and have powerful gripping mechanism. By making certain elements of the machine pivotal in accordance with my invention the necessity for this heavy construction is obviated because my novel machine supports only the end of the pipe placed in it, the other end of the pipe being free to move up and down and being supported on any convenient rest.

A further object of the present invention is to provide a machine or apparatus of the character stated in which a stationary base is provided upon which is mounted an adjustable pipe carrier and its complemental screw threading and pipe cutting parts.

A further object of the present invention is to provide a device of the character stated in which a pipe clamping element is longitudinally movable with respect to the body of the machine in order that the pipe may move longitudinally as the screw thread is being cut upon the pipe, and also in order that the end of the pipe may be projected beyond the front end of the machine to permit of a fitting being applied to it.

A further object of the present invention is to provide a device of the character stated in which the same device may be used interchangeably for either the screw threading of pipe or the cutting thereof.

Other and further objects of the present invention reside in the provision of general details of construction and arrangement and combination of parts for attaining the results sought in the foregoing objects.

Other and further objects not at this time appearing will be hereinafter more fully described and finally claimed.

The invention consists of the novel construction hereinafter described and finally claimed.

The nature, characteristic features and scope of the invention will be more fully understood from the following description taken in connection with the accompanying drawings forming part hereof, and in which:

Fig. 1, is a top or plan view of a machine or apparatus embodying the invention and showing a pipe clamped therein.

Fig. 2, is a view in side elevation of Fig. 1.

Fig. 3, is a view in section taken upon the line 3—3 of Fig. 1, the pipe, however, being omitted.

Fig. 4, is a view in cross section taken upon the line 4—4 of Fig. 1.

Fig. 5, is a view in cross section hereinafter referred to.

Fig. 6, is a view in longitudinal section taken upon the line 6—6 of Fig. 1.

Fig. 7, is a view in end elevation looking at the right hand side of Fig. 6.

Fig. 8, is a fragmentary view in section taken principally upon the line 8—8 of Fig. 7.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the drawings the reference numeral 1 designates a horizontal base plate provided with an upright 2 which latter terminates in a bifurcated portion comprising arms 3. These forked arms 3 pivotally support as by trunnions 4 and 4'' the screw threading and pipe cutting device about to be described. By reason of this pivotal relation of parts with respect to the stationary standard it is unnecessary for the machine to support the entire length of pipe which is being screw threaded but rather as the machine is pivoted the end of the pipe projecting may rest on any convenient support. Taking up now the pivotal parts as a whole, the reference numeral 5 designates a sleeve to which the trunnions 4 and 4'' are fixed and which trunnions have bearing in the arms 3 the said trunnions 4 and 4'' being extended over an annular collar 6 upon sleeve 5. The collar 6 is arranged intermediate of the screw threaded end 7 of said sleeve 5 and the annular rim 8 of said sleeve 5. Rotatably mounted on the sleeve 5 is a bevelled gear wheel 9. The face of gear wheel 9 abuts against collar 6 of sleeve 5 and the rear of said gear wheel 9 is secured to place by means of a lock washer 10 having screw threaded relation with the screw threaded ends 7 of sleeve 5. Carried by the bevelled gear wheel 9 are a set of dies 11 for cutting the screw threads upon the pipe 12. The manner of supporting these dies 11 will be hereinafter referred to. Fixed to shaft 4' is a bevelled gear wheel 13 in mesh with the bevelled gear wheel 9 and motion may be imparted to shaft 4' from a pulley 14 driven by a belt, not shown, or the shaft 4' may be hand driven. Slidable longitudinally along sleeve 5 is an annular member 15 which is operatively connected with respect to collar 6 by pivotal lengths 16 and 17, said lengths being pivotally connected by means of a hand lever 18, see Fig. 1. Thus the annular member 15 may be moved toward or away from collar 6 thus making it possible to force the end of the pipe against the threading dies, and once they grip the pipe the arrangement is then self feeding. It has the further object of protruding the end of the pipe entirely through the machine so that a fitting can be made up upon the end of the pipe. The sleeve 5 is slotted as at 19, see Figs. 1 and 2, in order to permit of this longitudinal movement of the pipe. For the purpose a series of thumb screws 20 are employed, the screw threaded ends of which pass through the annular member 15, the slots 19, and engage the pipe receiving member 21, as shown in Fig. 4, or it may positively engage the pipe as shown in Fig. 6. The pipe receiving member 21, just above referred to, may be omitted, as shown in Fig. 5, if desired. In order to positively prevent the pipe 12 from revolving use is made at the left hand end of the machine of a clamping device, best seen in Fig. 3. Carried by the flanged part of pipe receiving member 21, as by screws 22, is a member of U-shaped cross-section designated 23 provided internally with a continuous ring of teeth 24, in mesh with which are gear wheels 25 carried by shafts 26, carried by movable disc 27 having a handle 28. Carried by the shafts 26 are cams 29 having roughened faces, see Fig. 3. By moving disc 27 by means of handle 28 the cams 29 may be caused to engage or be disengaged from pipe 12. Once they engage the pipe the revolving tendency of the pipe automatically causes them to grip more securely.

Taking up now the screw threading device at the right hand side of Fig. 6, it is to be observed that the wheel 9 is provided with an annular recess 29'. Within this recess is arranged an annular ring 30 fixed to which by means of screws 31 is a disc-member 32. Movable between the recess 29' and inner face of disc-member 32 are the plurality of tools 11 above mentioned for cutting screw-threads upon pipe 12. These tools 11 are grooved as at 34 to cooperatively engage with ribs 35 arranged upon arcs of circles which ribs are preferably formed integral with a plate 36 as arranged between the bevelled gear wheel 9 and the tools 11. By moving the handle 37 the tools 11 may be caused to advance towards or recede from pipe 12.

In addition to the screw threading function of the machine the machine has the additional function of being efficient to cut pipes to different lengths. Fixed to the plate 32 as by means of screws, bolts, or the like are a pair of oppositely disposed cutter accommodating supports 38, see Fig. 8. Movable through these supports 38 are cutters 39, able through these supports being spring pressed see Fig. 7, said cutters being spring pressed as at 40, see Figs. 7 and 8. These cutters are each provided with a handle 41 so that the cutters may be moved toward or away from the pipe 12. The cutters 39 are adjustable to different sizes of pipes by a pin 39' that passes through a series of holes 39'' in them. This pin passes through the movable part 42.

It will be seen from the foregoing that my novel machine has the advantages of being fixed on its own base and yet possesses the lightness and simplicity of the hand die stock. If a machine of this general character is supported rigidly on a base, that machine must support the entire length of a piece of pipe put into it. This length of pipe projects from the back of the machine and must be supported by a grip of but comparatively few inches within the machine. The pipe may be 15 feet or more in length and may have considerable weight, and the projecting part being so great in comparison with the short portion in the machine, the weight of the pipe acting as it does with great leverage creates much strain in the machine. To compensate this strain the rigid machine must be built with a very heavy and strong base and frame, and with heavy and powerful gripping and centering mechanism.

By making this machine flexible or pivotal in accordance with my invention the necessity of this heavy and comparatively expensive construction is done away with. The pipe in the pivotal machine and the body of the machine with it (the one always aligned with the other) may be tilted up and down see-saw fashion within reasonable limits without affecting the operation of the machine. Thus the machine does not support the end of the pipe projecting from it; but instead the projecting end may be rested on the other end of the bench top to which the machine is bolted or on any convenient rest, as is evident. The reference numeral 43 designates a removable centering bushing of which different sizes may be employed to accommodate pipes of various diameters.

Having thus described my invention, what I claim as new and desire to secure by Letters Patent is:

1. In a device of the character stated a fixed base having a standard terminating in a bifurcated portion, a pipe carrying element including a clamp pivotally arranged between the bifurcated parts of said standard, a rotatable member mounted upon said pipe carrying element at right angles to the longitudinal axis of the pipe carrying element, means to rotate said member, pipe screw-threading means carried by said rotatable member, means to permit the movement of said screw-threading means toward or away from the longitudinal axis of said element, the pipe carrying element being free to tilt through a vertical plane, and means operatively carried by said rotatable member for cutting the pipe carried by said element.

2. In a device of the character stated a fixed base having a standard terminating in a bifurcated portion, a pipe carrying element including a clamp pivotally arranged between the bifurcated parts of said standard, means for moving said clamp longitudinally of said device, a rotatable member mounted on said pipe carrying element at right angles to the longitudinal axis of the pipe carrying element, means to rotate said member, pipe screw-threading means carried by said rotatable member, means to advance the said screw-threading means toward or away from the longitudinal axis of said element, the pipe carrying element being free to tilt through a vertical plane.

3. In a device of the character stated a fixed base having a standard which standard terminates in a bifurcated portion, a pipe carrying element including a clamp pivotally arranged between the bifurcated parts of said standard, a rotatable member mounted upon said pipe carrying element at right angles to the longitudinal axis of the pipe carrying element, means to rotate said member, pipe screw-threading means carried by said rotatable member, means to advance the said screw-threading means toward or away from the longitudinal axis of said element, the pipe carrying element being free to tilt through a vertical plane, and means operatively carried by said rotatable member for cutting pipe as carried by said element, said screw-threading and pipe cutting means being both arranged at one end of said device.

4. In a device of the character stated a fixed base having a standard which standard terminates in a bifurcated portion, a pipe carrying element including a clamp pivotally arranged between the bifurcated parts of said standard, a rotatable member mounted upon said pipe carrying element at right angles to the longitudinal axis of the pipe carrying element, means to rotate said member, pipe screw-threading means carried by said rotatable member, means to advance the said screw-threading means toward or away from the longitudinal axis of said element, the pipe carrying element being free to tilt through a vertical plane, means operatively carried by said rotatable member for cutting pipe as carried by said element, and means for moving said pipe cutting member independently of said screw-threading operating means.

FRANK DEVINE.